Jan. 2, 1962 A. V. POHM ETAL 3,015,807
NON-DESTRUCTIVE SENSING OF A MAGNETIC CORE
Filed Oct. 23, 1957
FIG.1.
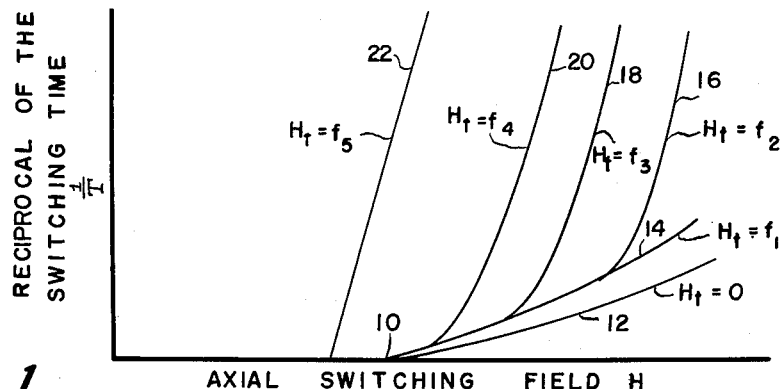
FIG.2.
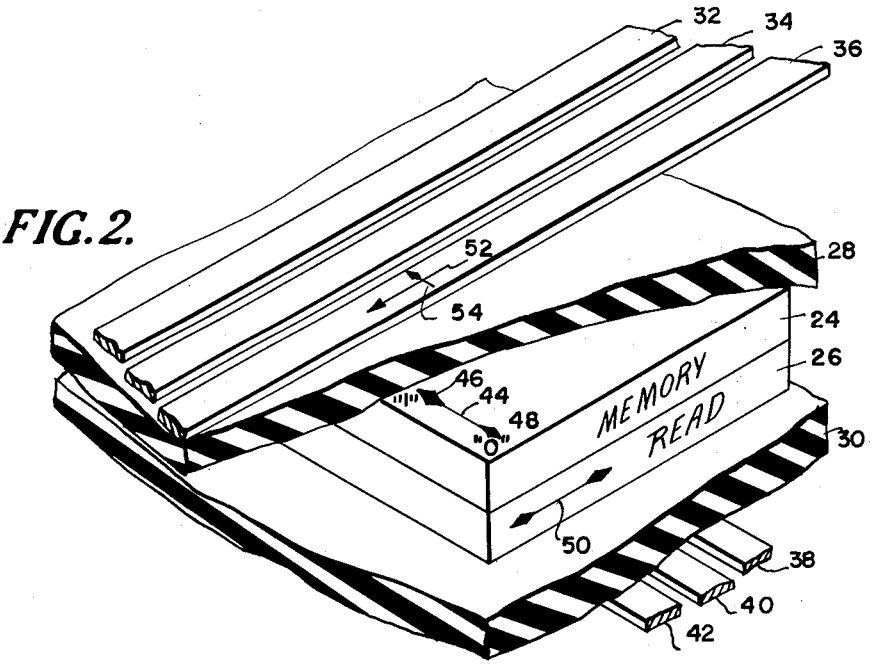
FIG.3.
INVENTORS
ARTHUR V. POHM
EARL N. MITCHELL
THOMAS D. ROSSING
BY *Cushman, Darby + Cushman*
ATTORNEYS

3,015,807
NON-DESTRUCTIVE SENSING OF A MAGNETIC CORE

Arthur V. Pohm, White Bear Lake, Earl N. Mitchell, St. Paul, and Thomas D. Rossing, Northfield, Minn., assignors to Sperry Rand Corporation, New York, N.Y., a corporation of Delaware
Filed Oct. 23, 1957, Ser. No. 691,902
18 Claims. (Cl. 340—174)

This invention relates to apparatus for causing non-destructive sensing of the state of a magnetic core having two stable magnetic states.

As used herein, the terms "non-destructive sensing" and "non-destructive readout" refer to the detection of the relative direction of remanent magnetization of a magnetic core without destroying or reversing such remanent magnetization. This does not necessarily infer, however, that the remanent magnetization may not be temporarily disturbed at least during the detection of the state of the core.

As the use of magnetic cores in digital computing machinery becomes increasingly popular, one desire of those attempting to increase the computational speeds of these machines is to obtain static magnetic memory apparatus which may be non-destructively readout. In retaining the same state of remanent magnetization, non-destructive readout eliminates the restoration cycle usually required to return a core to its pre-read state.

The information stored in a magnetic core is usually arbitrarily defined as one of the two possible directions of remanent magnetization. In digital machines usually one direction of remanent magnetization in a core is arbitrarily designated as a binary "1" and the second direction as a binary "0." Such cores are used both individually and in arrays of cores termed matrices to store information as herein described.

To cause non-destructive sensing of a core, a second core is employed with its axis of remanent magnetization disposed transversely of the axis of remanent magnetization of the core which is to be sensed. The remanent magnetization of the core to be sensed sets up a transverse field in the second or readout core. During sensing, this transverse field is made to increase or decrease so that a field applied along the remanent magnetization axis of the readout core will cause switching of the readout core only if the transverse field therein has been increased. The readout core therefore gives an indication as to the state of the remanent magnetization of the other core.

Preferably, the type of core employed in the present invention is a thin film formed in the manner disclosed in the Rubens application, Serial No. 599,100, filed July 20, 1956, now Patent No. 2,900,282, although other cores which are subject to be switched from one state to another in conjunction with a transverse field are included in this invention.

It is therefore the primary object of this invention to provide a magnetic core disposed transversely with another core as to their remanent magnetization axes so that the latter core will induce a transverse field in the former core whereby sensing of the state of the latter core may be accomplished without destroying the state thereof.

Another object of this invention is the provision of non-destructive sensing apparatus for a magnetic core by employing a second magnetic core disposed adjacent to the first magnetic core with the axis of remanent magnetization of the cores being transverse to each other, along with means for inducing in the second core a field transverse to its remanent magnetization so as to be additive or subtractive to the magnetization therein due to the first core in accordance with the state of remanent magnetization of the first core thereby determining whether the second core will change its state during a time when a field is simultaneously applied along the direction of magnetization of the second core.

Still other objects of this invention will become apparent to those of ordinary skill in the art by reference to the following detailed description of the exemplary embodiment of the apparatus and the appended claims. The various features of the exemplary embodiment according to the invention may be best understood with reference to the accompanying drawings, wherein:

FIGURE 1 is a graph illustrating the variation of switching speed of a thin film core as a function of the field intensities of the transverse and remanent axis switching fields;

FIGURE 2 illustrates an exemplary embodiment of this invention, and

FIGURE 3 illustrates an exemplary waveform for interrogating electrical impulses useful with this invention.

The effect of a magnetic field oriented transverse to the axis of magnetization in a magnetic core is disclosed in the Rubens et al. United States patent application Serial No. 626,945, filed December 7, 1956 entitled "Magnetic Apparatus and Methods." The Rubens et al. application teaches that when a magnetic core with rectangular hysteresis loop characteristics has applied thereto a first field along the remanent magnetization axis in time coincidence with a second field transverse thereto, the speed of switching of the core is increased.

This effect is particularly noticeable with thin film cores of the type which are vacuum evaporated or otherwise deposited on a substrate as disclosed in said Rubens Patent No. 2,900,282, and the description in the present application will proceed relative to such film cores, but it is to be understood that the present invention is equally applicable to other type cores which may be switched or not from one state to another in accordance with whether a sufficient transverse field is present.

In a magnetic film of about one domain thickness (approximately 1000 to 2000 Angstrom units) the switching time decreases as the transverse field, i.e., the magnetic field orthogonal to the preferred direction or easy axis of remanent magnetization, is increased. This variation is graphically illustrated in FIGURE 1 wherein the reciprocal of the switching time T is plotted as a function of the longitudinal or remanent axis switching field for different transverse field $H_T$ intensities. Point 10 on the ordinate represents the wall motion coercivity in oersteds. Curve 12 is a plot of the switching time variation when $H_T=0$. Curves 14, 16, 18, 20 and 22 are the family of switching curves for increasing transverse field intensities $f_1$ to $f_5$. Curve 22 demonstrates that as the transverse field is increased, the effective coercivity of a thin film core is reduced.

From the foregoing it has been found that the remanent axis switching field strength can be chosen such that when applied to a core for a predetermined period of time, the core will switch or change state in the presence of a relatively strong transverse field but will not change state in the absence of such a transverse field. By limiting the transverse field strength to either a strong field, for example a field strength of greater than 0.5 oersteds, or to a weak field, for example less than 0.01 oersteds, a magnetic core can be used to reliably discriminate between the presence of a strong transverse field and the presence of a weak transverse magnetic field. When a predetermined longitudinal switching field is applied and the core switches, a voltage is induced in all windings thereon, indicating the presence of a relatively strong transverse field; while when the core does not switch, the lack of voltage in the windings thereon is indicative of a weak or absent transverse field.

The present invention applies the foregoing to provide an efficient and novel means for non-destructive sensing or readout of a magnetic core. With reference to the exemplary embodiment illustrated in FIGURE 2, core 24 is the core to be sensed. This core may be considered as one of a plurality of cores such as an array in a memory matrix system, or may be considered as a single core which is used individually to store information in any type system. For convenience, this core may be referred to as the information or memory core. To cause non-destructive sensing or readout of the information in the memory core 24, a second core 26 is associated therewith. Because of its purpose, core 26 is herein termed the sensing or readout core. Preferably, both of the cores 24, 26 are thin film cores of the type above referred to; however, this need not be the case since other types of cores may be employed with the realm of this invention. The magnetic material used in the cores preferably exhibits a rectangular hysteresis characteristic such that the residual magnetization is a relatively large percentage of the applied saturating magnetic field.

Film cores 24 and 26 when formed in conformance with the Rubens patent above mentioned, are evaporated on their respective substrates 28 and 30 which preferably consist of glass. In a memory matrix system each substrate may support a plurality of such cores, for example a plane of cores in a matrix array. However, limitation thereto is not intended since each substrate may support a single thin film core as illustrated. The cores may be not only evaporated onto the substrates, but may be plated or otherwise have the insulative substrates positioned above and below the cores respectively so as to insulate the cores from their respective windings. Windings 32, 34 and 36 are associated with memory core 24, while windings 38, 40 and 42 are associated with the readout core 26. As illustrated, these windings are preferably straight line conductors which are preferably printed circuits etched or otherwise disposed on the substrates or other insulative material, for example, as in the manner set forth in the above mentioned Rubens et al. application, Serial No. 626,945.

In placing the cores 24 and 26 adjacent each other, the easy axes of magnetization of the two cores are disposed transversely of each other. Line 44 may be considered the easy axis of magnetization for the information core 24 with the arrowhead 46 representing the remanent magnetization when in one direction which is arbitrarily referred to as the "1" state, while arrowhead 48 represents the other direction of remanent magnetization termed the "0" state. Similarly, the easy axis of magnetization of the sensing or readout core 26 is indicated by line 50, with the arrowheads at either end thereof being representative of the two states of magnetization of the readout core.

Any means may be employed to change the information core 24 from one of its states to the other, and for this purpose the windings 32 and 34 may be employed. These windings, are normally present in a memory matrix system wherein coincident currents are used to select a given core. In addition, the winding 36 is normally present as an inhibit means to prevent selection of a given core in a group thereof. The current which normally flows in any one of windings 32, 34, 36 is generally referred to as a "half-current" and is insufficient by itself to cause a change in the state of the information core 24. However, in conjunction with one another, the currents in any two of these windings when in the same relative direction will produce a field in the memory core 24 to place it in a given state, while if at the same time a current is in the third winding in an opposite direction, the core is inhibited from changing its state.

Regardless of the direction of remanent magnetization in core 24, there is induced in the readout core a flux which causes a transverse field therein. This field is along the same axis 44 as the remanent magnetization of the memory core and is almost as strong in its effect on readout core 26 as is the remanent magnetization of the memory core. In other words, the coupling of the remanent and induced magnetization from the memory core to the readout core is relatively high, the only difference being that which is lost in the coupling, the readout core being highly sensitive to having a transverse field induced therein. On the other hand, the information core 24 is relatively insensitive to having transverse fields induced in it. Consequently, the remanent magnetization of readout core 26 is relatively ineffective in causing a transverse field in the memory core 24. The regulation of the sensitivity of thin film cores to transverse magnetic fields can be accomplished by subjecting the cores individually to elevated temperatures while applying a magnetic field thereto. The transverse permeability of a core is decreased when the applied field is parallel to the axis of easy magnetization of the core, but is increased when the field is perpendicular to the easy axis of magnetization. In this manner, the transverse field sensitivities of the two cores can be easily regulated so that there is large coupling of the remanent magnetization of memory core 24 to the readout core 26 but negligible coupling of the remanent magnetization of the readout core to the memory core.

Whenever it is desired to sense the state of the memory core 24, without destroying the state thereof, a current is passed through one of the windings 32, 34 or 36 simultaneously with current in windings 38 and 40. For the sake of example, it is assumed that the inhibit winding 36 is employed to carry current during the sensing period. Preferably, the current in winding 36 during this time is always in a given direction, and it will be assumed that the direction thereof is always like that shown by current arrow 52. The field produced by this current is then in the direction shown by arrow 54. Upon comparing arrow 54 with the remanent magnetization arrow-heads 46 and 48, it becomes apparent that the field either opposes or adds to the remanent magnetization in the memory 24 according to the state thereof. Consequently, the transverse field caused in the readout core by the remanent magnetization in the memory core at such times will be either reduced or added to. Preferably, current 52 is of such value that the resulting field 54 substantially cancels the transverse field in readout core 26 when the remanent magnetization in the memory core 24 is in a "0" state, but doubles the field when the memory core is in its "1" state. It becomes apparent, therefore, that at different times there may be three different values of transverse magnetization in the readout core 26. That is, without current 52, the normal amount of transverse field as caused by the remanent magnetization of the memory core exists, while during the presence of current 52, there is substantially no transverse field in readout core 26 or substantially twice as much field as normally existing in the absence of current 52.

Upon coincident application of half-currents in windings 38 and 40, in the absence of current 52, readout core 26 will not be switched since the transverse field therein is insufficient to cause switching. The same is true in the presence of current 52 if field 54 opposes the "remanent" transverse field in readout core 26. However, if field 54 is additive to the remanent transverse field in core 26, the readout core will change its state. Such change of state will induce an E.M.F. in the sensing winding 42 to indicate that the memory core is in its "1" state. However, when readout core 26 does not change its state, substantially no E.M.F. will be induced in winding 42. An indication is thereby given that the memory core is in its "0" state.

Since the coupling of the remanent magnetization of the readout core 26 to the memory core 24 is negligible, there is no switching of the state of the memory core during a sensing period. Consequently, the state of the memory core remains unchanged, although it may be disturbed momentarily. Preferably, the current which is applied to each of windings 38 and 40 is bi-polar or alternating similar to that shown by the waveform in FIGURE 3. Therefore, the readout core will change its state twice during a sensing period if the memory core 24 is in its "1" state. It is not essential that the currents in windings 38 and 40 be alternating since a single change of state of the readout core will provide a signal sufficient to indicate a "1." However, use of an alternating current in windings 38 and 40 eliminates the requirement that the external apparatus (not shown) supplying the currents remember which state the readout core was in after the last sensing period. That is, with only a single polarity current being used for windings 38 and 40 during any given sensing period, the current employed for successive periods need to be of different polarity so as to be alternating.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus comprising a plurality of magnetic cores each core having two stable remanent magnetic states and an axis of remanent magnetization, said cores being disposed adjacent one another with said axes transverse, one of the said cores being susceptible to and having a transverse field applied to it by the remanent magnetization of another core whose remanent axis is transverse to that of said one core, means for changing the amount of said transverse field, and means coupled to said one core for changing the state thereof at least once but only during the existence of the changed transverse field and then only if said another of the cores is in one state but not if it is in another state, the arrangement being such that in either case the state of said another core is not destroyed.

2. Apparatus comprising first and second magnetic cores, each core having two stable remanent magnetic states and an axis of remanent magnetization, said cores benig disposed adjacent one another with said axes transverse with said second core being susceptible to and having a transverse field applied to it by the remanent magnetization of said first core, means for changing the amount of said transverse field means coupled to said second core for changing the state thereof at least once but only during the existence of the changed transverse field and the only if the first core is in one state but not if the first core is in another state, and means coupled to said second core for sensing a change of state therein, the arrangement being such that the state of the first core is not destroyed whether the second core changes state or not.

3. Apparatus as in claim 2 wherein at least said second core is a magnetic film.

4. Apparatus comprising first and second magnetic cores, each core having two stable remanent magnetic states and an axis of remanent magnetization, said cores being disposed adjacent one another with said axes transverse, the remanent magnetization of the first core causing in the second core a first field transverse to the remanent magnetization of the second core, means for applying a second transverse field to the second core, and means simultaneously acting with the last mentioned means for applying a field along the remanent magnetization axis of the second core, the arrangement being such that if said first and second fields are additive the second core changes its state at least once to indicate one of the states of the first core, but if the first and second fields are subtractive, the second core does not change its state thereby indicating another state of said first core.

5. Apparatus for non-destructively sensing the state of a magnetic core comprising a plurality of film magnetic cores, each core having two stable remanent magnetic states and an axis of remanent magnetization, said cores being disposed adjacent one another with the axes thereof transverse, the remanent magnetization of one of the cores causing in a transverse one of the other cores a first field transverse to the remanent magnetization of the latter mentioned core, means including winding means associated with the first mentioned core for applying a second transverse field to the latter mentioned core, and means including other winding means associated with the latter core and simultaneously acting with the second field applying means for applying a field along the remanent magnetization axis of the latter core, the arrangement being such that if said first and second fields are additive, the latter core changes its state at least once to cause an E.M.F. in said other winding means thereby indicating one of the states of the first mentioned core, but if the first and second fields are subtractive, the latter core does not change its state and no substantial E.M.F. is induced in said other winding means thereby indicating another state of the first mentioned core.

6. Apparatus as in claim 5 wherein said winding means comprise printed circuits.

7. Apparatus as in claim 5 wherein at least part of said other winding means carries at least one cycle of alternating current to cause said remanent magnetization field in the latter core whereby the latter core changes state twice when said first and second fields are additive but not at all when subtractive, the state of the first mentioned core being unchanged whether the latter core changes states or not.

8. Apparatus for non-destructively sensing the state of a magnetic core comprising first and second film magnetic cores, each core having two stable remanent magnetic states and an axis of remanent magnetization, said cores being disposed adjacent one another with said axes transverse, the remanent magnetization of the first core causing in the second core a field transverse to the remanent magnetization of the second core, winding means coupled to the first core for applying a field along the remanent magnetization axis thereof insufficient to cause the first core to change its magnetic state but sufficient to cause at least substantial reduction of said transverse field when the first core is in one state and to cause an increase in the transverse field when the first core is in another state, and second winding means coupled to said second core for applying a field therein along the remanent magnetization axis of the second core, said last mentioned field being insufficient by itself to change the state of said second core, and third winding means coupled to the second core for sensing a change in state thereof, the arrangement being such that said second core may change its state at least once only when said transverse field therein is increased thereby allowing an E.M.F. to be induced in said third winding means to indicate that said first core is in said another state, a reduced transverse field preventing any change in state of the second core and consequently precluding an induced E.M.F. in the third winding means thereby indicating that the first core is in said one state, the state of the first core being unchanged whether or not the second core changes state.

9. In a coincident current memory matrix system having a plurality of bistable magnetic cores each with a plurality of winding means traversed respectively by the coincident currents during selection of a given magnetic core, the improvement comprising a second bistable magnetic core for at least one of the cores of said plurality thereof, said second core having an axis of remanent magnetization disposed transversely of the remanent magnetization axis of said one core, the remanent magnetization of said one core causing in the second core a first field transverse to the remanent magnetization of the second core, means for applying to the second core a field along its remanent magnetization axis, one of the winding means for said one core having a current therein simultaneously with the application of said last mentioned field for inducing a second transverse field in the second core, the arrangement being such that said one core is in a given state only if said first and second transverse fields are additive thereby allowing said second core to change its state at least once during the time said second field is applied thereto, otherwise said one core is in a different state.

10. Apparatus as in claim 9 wherein at least said second core is a thin magnetic film.

11. Apparatus for non-destructively sensing the state of a magnetic core comprising a magnetic core having first, second and third winding means associated therewith, current through any one of the winding means being insufficient to change the state of the first core but currents simultaneously through two of the winding means being sufficient to change the state of the first core if the currents are in the same relative direction while current through the third winding means at the same time in an opposite direction inhibits a change of state in the first core, said first core having an easy axis of magnetization along which the remanent magnetization of core lies in one direction or the other when in first and second stable states respectively, a second magnetic core similarly having an easy axis of magnetization and two stable states of remanent magnetization, the cores being disposed adjacent each other with the easy axes thereof transverse, fourth, fifth and sixth winding means coupled to said second core, said fourth and fifth winding means respectively having currents which when coincident apply a field to the second core along its easy axis of magnetization, said last mentioned field being insufficient of itself to cause a change in the state of said second core, the magnetization of the first core causing in the second core a field transverse to the easy axis of magnetization of the second core while the magnetization of the second core causes substantially no transverse field in the first core, the arrangement being such that when current is in only one of the first three winding means simultaneously with current in the fourth and fifth winding means, an E.M.F. is induced in the sixth winding means if the second core changes its state at least once to indicate that the first core is in one of its states, but no substantial E.M.F. is induced in the sixth winding means when the second core does not change its state thereby indicating that the first core is in another of its states, the state of the first core being unchanged in either case.

12. Apparatus as in claim 11 wherein said cores are magnetic films and said winding means are printed circuits.

13. A non-destructive sensing system comprising two adjacent bistable magnetic elements having their remanent magnetization axes oriented at an angle to each other for applying to one element due to the remanent magnetization of the other element a biasing field which is at an angle to the remanent magnetization axis of the said one element, means for changing the strength of said biasing field, means for applying to said one element concurrently with the changed biasing field a second field oriented at an angle to the changed biasing field, and output means for sensing any change in the remanent magnetization of said one element due to the application of said second field to provide an output signal indicative of the stable state of said other element without changing that element to its opposite stable state.

14. A non-destructive sensing system as in claim 13 wherein the remanent magnetization axes of said elements are oriented transversely of each other whereby said biasing field is transverse to the said axis of said one element, and wherein the second field is applied parallel to the said axis of said one element.

15. Apparatus as in claim 2 wherein the last mentioned means includes a line disposed substantially perpendicular to the said remanent axis of said second core whereby a relatively large signal is induced in said line when the second core changes state compared to a relatively small if not negligible signal when the second core does not change state.

16. Apparatus as in claim 4 wherein at least said second core is a magnetic film type core.

17. A magnetic device comprising two open flux path type multistable state magnetic elements adjacently disposed in superposed relationship with each element only partially closing the otherwise open flux path of the other, one of said elements itself producing an external field which is as regards its effectiveness on the other of said elements effectively substantially stronger than the like external field which is produced by the said other element itself for causing said other element to be magnetically biased by the said one element.

18. A magnetic device comprising two open flux path type multistable state magnetic elements having respective easy magnetization axes and adjacently disposed in superposed relationships with said axes transverse of one another and with each element only partially closing the otherwise open flux path of the other, each element when in any one of its said stable states effecting itself an external magnetic field which at least has a component directed transversely of the said easy axis of the other of said elements, the sensitivity of a first of said elements to the said external field from the second of said elements being substantially greater than the sensitivity of the said second element to the said external field from the said first element, whereby said first element is substantially biased by the said second element.

References Cited in the file of this patent

UNITED STATES PATENTS 2,870,433    Simpson _____ Jan. 20, 1959

OTHER REFERENCES

Nondestructive Sensing of Magnetic Cores, by D. A. Buck and W. I. Frank from "Communications and Electronics," January 1954, pp. 822–830.

Nondestructive Sensing of Magnetic Cores by D. A. Buck and W. I. Frank, from "Electrical Engineering," February 1954, p. 110.

A New Nondestructive Read for Magnetic Cores, by Thorensen and Arsenault. From 1955 Western Joint Computer Conference, published August 1955, pp. 111–116.